May 20, 1952    O. J. UNDERWOOD    2,597,207
SPEED RESPONSIVE GENERATOR
Filed March 8, 1950

INVENTOR.
ORVILLE J. UNDERWOOD
BY
George H Fisher
ATTORNEY

Patented May 20, 1952

2,597,207

UNITED STATES PATENT OFFICE 2,597,207

SPEED RESPONSIVE GENERATOR

Orville J. Underwood, Minneapolis, Minn., assignor to Minneapolis-Honeywell Regulator Company, Minneapolis, Minn., a corporation of Delaware Application March 8, 1950, Serial No. 148,370

11 Claims. (Cl. 171—252)

My invention relates to speed responsive generators commonly known in the industry as "velocity generators" and more particularly to improvements in a velocity generator of an alternating current type. Such generators have a signal output proportional to the speed of rotation of a prime mover which drives the same and of a constant frequency. In the past velocity generators have been subject to a disadvantage in that they have an extraneous signal output when the prime mover is at a standstill, this signal output being called a zero signal. The copending application of Willis H. Gille Serial No. 139,937 filed January 21, 1950, now Patent No. 2,581,093, issued January 1, 1952, on Speed Responsive Generators discloses a method of substantially eliminating zero signal, but that generator still has a disadvantage in that an out of phase flux component of the energizing flux generating the signal output is not balanced out with the generator at a standstill condition. The present invention is directed to a means for the elimination of the out of phase component of flux which in part produces zero signal. This is accomplished by the insertion of a flux shifting means in a portion of the magnetic circuit of the generator.

It is therefore an object of this invention to provide an improved velocity generator which has no signal output or zero signal when the driving prime mover is at a standstill.

It is also an object of this invention to provide in a velocity generator an improved means of eliminating zero signal.

Another object of this invention is to provide in a velocity generator an inner pole member having a shading coil thereon whose position is adjustable relative to the remaining portion of the generator to eliminate the zero signal in the generator.

A further object of this invention is to provide a velocity generator having a magnetic circuit with a variable air gap and flux shifting means therein, the air gap and flux shifting means being adjustable relative to the magnetic circuit and to one another for the purpose of eliminating zero signal.

Figure 1:
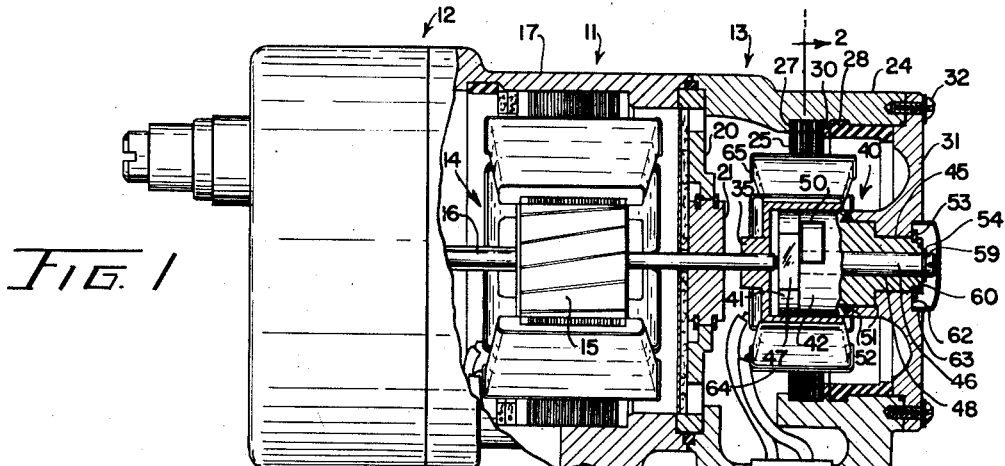
Figure 3:
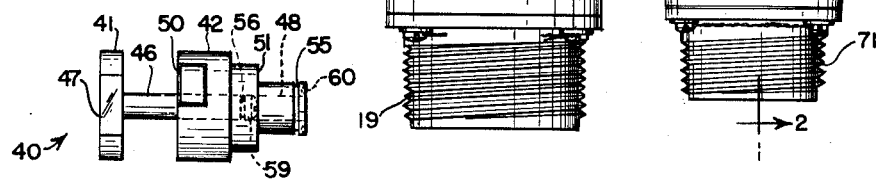
Figure 4:
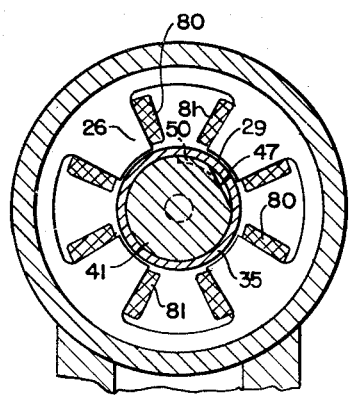
Figure 2:
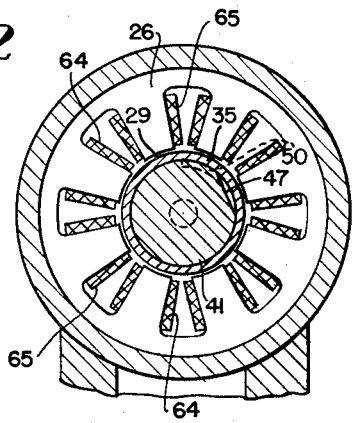

These and other objects of this invention will become apparent from a reading of the attached specification together with the drawings wherein:

Figure 1 is a side elevational view in section of the improved velocity generator attached to a prime mover, Figure 2 is an end elevation view in section of the subject velocity generator taken along the line 2—2 of Figure 1 to disclose the relationship of parts, Figure 3 is a plan view of the inner pole of the subject velocity generator, and Figure 4 is an end elevation view in section of a modification of the subject velocity generator.

The speed responsive generator or velocity generator while not new in the art is a device which has found ever increasing use in recent years for controlling and indicating purposes. While devices of this type may take many forms, they are generally designed and constructed to be quite similar to a two phase induction or hysteresis type of motor. The magnetic circuit of such a device is essentially the same as a motor of this type except that only one phase is energized, being used for power input, while the other phase is used as a secondary or pickup coil. Such a unit may be a multipolar device and in this form alternate coils on the magnetic circuit or stator are adapted to be connected as primary and secondary coils respectively. The rotor of a generator of this type, while it may take many forms, is usually an "infinite bar" type of squirrel cage unit. The "infinite bar" effect in a squirrel cage rotor is obtained by using a sleeve of electrically conductive material mounted on an iron core or encircling an iron inner pole. In the former cases, the sleeve and core rotate as a unit and in the latter the sleeve rotates while the inner pole is stationary. It is the latter type with which this subject invention is concerned.

The velocity generators of this type operate on the principle that the primary or stator creates a flux which traverses the rotor or sleeve to the inner pole returning through the sleeve to the stator. This rotor or sleeve when turning has set up therein a quadrature component of flux which flux threads the secondary or pickup coils or coil to produce therein a signal output. When the rotor is not turning, only eddy currents flow in the sleeve type rotor and these eddy currents do nothing more than cut down the total flux passing through the rotor.

With the rotor revolving, induced currents flow therein which currents are proportional to the primary or driving flux and the instantaneous speed of the rotor. The quadrature flux generated thereby is directly proportional to the circulating current in the rotating element.

Speed responsive generators of this type have a common difficulty in that they all possess a zero signal or output signal at zero velocity of the rotor. This zero signal is caused by conditions of unbalance in the magnetic circuit due to shorted turns on the primary and secondary windings, unequal pole tip gaps and polarization of parts of the magnetic circuit and the rotor. Attempts have been made to correct for this unbalance in the magnetic circuit, as for example, in the Gille application noted above in which the secondary coil was mounted on the inner pole and made adjustable with the primary windings. This arrangement permitted the adjustment of the in-phase zero signal but a portion of this extraneous signal still remained which was out of phase with the incoming energizing source. The subject invention relates to the method of eliminating this source of zero signal.

The improved velocity generator of the subject invention, as noted above, is designed to produce an alternating current signal for indication purposes or for control purposes as a function of speed of a prime mover which drives the same. As such, devices of this type are mounted on or attached to the prime mover, the operation of which it is desired to govern or indicate. When the generator is used for controlling purposes, it will be connected in a control circuit in a manner such as is shown in the Riggs Patent 2,115,086 dated April 26, 1938.

Figure 1 discloses in section a typical method of mounting the velocity generator of the subject invention on a prime mover such as a servomotor indicated generally at 10. The servomotor consists of a motor or power unit 11, its gear train section 12 and a velocity generator unit 13 which components are held together by suitable means such as screws not shown. Since the motor 11 and gear train 12 form no part of the subject invention, they will not be described in detail. For the purpose of showing how the velocity generator is mounted on and attached to the servomotor, a portion of the motor casing is cut away to disclose the motor unit 11 as an eight pole squirrel cage induction motor unit 14 having a squirrel cage rotor 15 mounted on a shaft 16. A casing member 17 enclosing the motor unit 11 mounts a barrier plate 20 containiong a sleeve type journal 21 which journals one end of the shaft 16. The other end of the shaft 16 of the squirrel cage motor unit 14 is journaled in the gear train 12 by means not shown. Casing 17 of the motor unit is generally cylindrical in form and has projecting therefrom at right angles thereto a cylindrical portion 18 which houses a terminal board or connector unit 19 commonly known as an AN connector by means of which power may be supplied to the motor unit.

The velocity generator unit 13 is similar in form to the power unit 11 and is housed in a casing 24 which abuts casing 17 of motor unit 11 and aids in the positioning of the barrier 20. For purposes to be later described shaft 16 of the motor projects beyond the barrier 20 and journal 21 and into the casing 24. The casing 24 is attached to casing 17 and the gear train unit 12, as noted above, by a suitable means such as screws, not shown, to mount the unit in a tandem relationship. Generator unit 13 comprises a stator 25 formed of laminated magnetic material which is similar in form to the stator of the induction motor unit 14. The embodiment of the generator shown in Figure 1 is an eight pole device. As will be seen in Figure 2, the stator is annular in form having eight salient poles 26 thereon each pole mounting a winding to be later described.

The laminations of the stator are held together by any suitable means such as rivets, and the stator is positioned within the casing 24 to abut a shoulder 27 therein. A retaining ring 28 fits into casing 24 and positions the stator 25 within the casing being separated therefrom by an insulating strip 30. Ring 28 is held in position within the casing 24 by means of a cover plate 31 which encloses the end of casing 24 and is mounted thereon by screws 32. Stator 25 when so mounted is concentric with the stator of motor 14 and shaft 16 and the poles 26 thereon form a circular opening 20 within which is positioned a cup-shaped or sleeve type rotor element 35 of electrically conductive material, the rotor being attached to the extremity of the shaft 16 which projects beyond the barrier plate 20. Rotor 35 is secured to shaft 16, in any suitable manner such as by press fitting and is designed to rotate within the circular opening 20 formed by the stator 25 of the velocity generator.

Within the opening formed by the cup-shaped rotor 35 is positioned an inner pole structure indicated at 40 which structure forms a part of the magnetic circuit of the velocity generator with stator 25. The inner pole structure is cylindrical in form and comprises two inner pole members 41 and 42 which fit together and are mounted in an opening 45 formed in end plate 31. Inner pole member 41 is shaped like a cylindrical disc with a stem 46 projecting therefrom, the disc having a flattened surface 47 thereon. Inner pole member 42 is also cylindrical in form and of the same diametrical dimension as pole 41 having an aperture 48 therethrough to which stem 46 projects, as can be seen in Figures 1 and 3. The peripheral surface of the inner pole member 42 has a shading coil 50 or short circuited electrical conductor embedded in the surface thereof. The inner pole members 41 and 42 when assembled fit into the opening 45 of end plate 31 being positioned thereon by means of a shoulder portion 51 such that the flat surface 47 and the shading coil 50 of the inner pole members 41 and 42 respectively are disposed substantially in the same plane as the stator 25 of the generator. A rubber gasket member 52 is positioned between the end plate 31 and inner pole 42 to provide a seal between these members and as will be later noted to present a friction surface between these members. A similar gasket (not shown) is employed between the inner poles 41 and 42 for the same purpose. Inner pole members 41 and 42 as they project through end plate 31 are secured thereon by means of snap rings 53 and 54. As can be seen in Figure 3, the snap ring 53 is adapted to fit into a groove 55 in inner pole 42 and the snap ring 54 is adapted to fit into a groove 56 in the stem 46 of inner pole 41. With the snap rings 53 and 54 in position on inner pole members 41 and 42, the inner pole structure is securely mounted on plate 31. The inner pole member 41 is designed to move relative to the plate 31 and inner pole member 42 by means of overcoming the frictional engagement between these members. A grooved or tool receiving head 59 is provided at the exposed extremity of stem 46 which projects through the inner pole member 42 and plate 31. Inner pole member 42 is similarly provided with a tool receiving portion 60 in the form of notches or grooves in the free extremity thereof which projects beyond the plate 31. Member 42 is also adapted to be moved relative to inner pole 41 and plate 31 by overcoming the frictional engagements between the respective members. A cover 63 is inserted into an aperture 62 in the end of plate 31 to enclose the exposed extremities of the inner pole members 41, 42 the cover being adapted to be removed when it is desired to adjust the inner pole members relative to the remaining portion of the magnetic circuit. The inner pole structure 40 when so mounted on casing 24 through the plate 31 forms with the stator 25 an annular air gap within which the rotor 35 is positioned. With the exception of the flat surface 47 on inner pole member 41, this air gap is uniform throughout and by means of adjustment of the inner pole 41 may be varied by changing the position of the flat surface 47 relative to the poles 26 of stator 25.

As noted above the poles 26 of stator 25 have windings mounted thereon. These windings are designated with numbers 64 and 65 to indicate the purposes of each, the windings 64 being the primary or main energizing windings of the generator, and the windings 65 the secondary or pick-up windings of the generator. As will be seen in Figure 2, the eight pole unit has four primary energizing windings 64 spaced alternately about the stator and four secondary windings 65 similarly positioned. The primary windings 64 are adapted to be connected in a series connection (not shown) and energized with an alternating current source of power. Suitable conductors such as are indicated at 70 (only one of which is shown) connect the primary windings 64 to a terminal board or AN connector 71 mounted on the casing 24 of generator 13. The secondary windings 65 are similarly adapted to be connected in a series connection (not shown) and connected to the AN connector 71 by conductor 73. These secondary windings when the rotor 35 is rotated and primary windings 65 are energized with an alternating current will have generated therein an alternating signal proportional to the speed of rotation of the rotor 35 and with a frequency output which is similar to the energizing frequency of the primary windings 64.

Figure 4 of the drawings discloses in section a modification of the subject generator, this modification employing a four pole unit. This modification is shown to indicate that the subject invention may be employed with any particular pole arrangement. Induction motor stator of this unit employs only four poles 26 of which two have primary windings 80 and two have secondary windings 81 mounted thereon, these poles being spaced 90° from one another. The remaining portion of this modification is the same as that described in connection with Figures 1, 2 and 3.

In operation, the subject velocity generator is unlike a conventional generator in that a negligible amount of power is required to drive the same. With the primary winding 64 of the stator 25 energized with an alternating current, a magnetic flux is created in the stator which will traverse the poles 26, the rotor 35 and the inner pole structure 40 returning to the stator through the air gap between the stator and inner pole structure and the rotor 35. As noted above, magnetic unbalance of the stator due to irregularities in the pole pieces and variations in the air gaps between the poles and the inner pole member permit the flux lines which thread the magnetic circuit formed by the stator and inner pole to generate in the secondary windings a signal output when the rotating element or short circuited conductor 35 is at a standstill. Shorted laminations in the stator and shorted turns on the primary windings further account for unbalance and provide an out-of-phase signal from the primary coils which also generates an extraneous or zero signal with the rotor at standstill. Rotational adjustment of the inner pole member 41 having the flat surface 47 thereon counteracts magnetic unbalance of the stator and balances out the in phase component of this signal, that is the component which is in phase with the energizing current in the primary windings. Adjustment to the inner pole member 41 is made by removing cover 63 and inserting a tool in the tool receiving portion 59 of stem 46 and rotating the member 41 against the frictional engagement provided by the snap ring 54 which secures the same. The zero signal component which is not in phase with the energizing current of the primary winding and which is caused by variations in eddy current due to shorted laminations and shorted turns as well as leakage flux from pole to pole tip may be balanced up by inner pole member 42 which is mounted on end plate 31 through a frictional engagement described above. With cover 63 removed, a suitable tool may engage the tool receiving portion 60 of inner pole 42 and the inner pole may be rotated against the frictional engagement described above to position the inner pole member with the shading coil thereon to a point where the out-of-phase component of zero signal is balanced out. When adjusting one or the other of the inner pole members 41 and 42, it will be noted that the two will move together due to the frictional engagement between the members. Thus when it is desired to adjust only one of the members, it may be necessary to insert a tool in the other to hold the position of such member as the desired member is adjusted. Thus the inner pole member 41 with the flat surface 47 thereon is used to adjust the quantity of flux threading the secondary coils and the inner pole member 42 with the shading coil 50 thereon will shift the phase of the flux linking the respective secondary coils so that time phase of flux may be adjusted between the respective secondary coils thereby balancing out zero signal. Such adjustment is usually made to the generator when it is assembled and unless magnetic conditions change in the stator and the magnetic circuit, no further adjustment should be required. However, the device is adapted to be adjusted in the field by merely removing the cover 63 from the end plate 31 and adjusting the inner pole structure 40 with respect to the stator 25 as indicated above.

As rotor 35 is driven with the primary coils 64 energized with an alternating current, the primary flux generated in the magnetic circuit by the primary winding 64 will be cut by the rotating short circuited inductor of rotor 35 inducing therein a current. This current will generate a quadrature flux which will pass through the secondary windings 65 inducing therein a signal output. The quadrature flux is directly proportional to the circulating current in the copper sleeve, this current being proportional to the instantaneous primary flux and the instantaneous speed of the rotor. The signal output from the secondary coils which is produced by the quadrature flux is of a constant frequency, and as indicated above is proportional to the speed of rotation of the rotor. With the teaching of the present invention, the zero or no speed signal of the velocity generator may be completely balanced out or eliminated thereby increasing the usefulness of the device in controlling circuits where it is desired to have a true zero signal when the device is at a standstill.

While the present disclosure relates to a particular type of velocity generator, that is, an induction motor type utilizing an inner pole, it should be kept in mind that the teaching of this invention may be applied to the magnetic circuits of any velocity generator and that this disclosure is intended to be illustrative only. Therefore, the scope of the invention should be determined only by the appended claims.

I claim:

1. In a device of the class described, a primary core structure having a plurality of salient pole members with windings thereon, a secondary core structure located within said primary core structure completing a magnetic circuit therewith and defining an annular air gap therebetween, said secondary core structure comprising two cylindrical magnetic core members adjustable relative to one another with one of said core members having a flat surface thereon and the other having a shading coil thereon, and a short circuited conductor member of electrically conductive material positioned within said annular air gap and disposed to rotate therein.

2. In a device of the class described, a primary core structure having a plurality of poles and a plurality of windings mounted thereon, alternate windings on said primary core structure being adapted to be energized by an alternating current source of power, the remaining windings of said primary core structure being adapted to have a signal voltage generated therein, a secondary core structure located within said primary core structure completing a magnetic circuit therewith and defining an annular air gap therebetween, said secondary core structure comprising a cylindrical magnetic core having a shading coil positioned thereon adjacent said annular air gap, and a sleeve of electrically conductive material positioned in said annular air gap and disposed to rotate therein to generate in said remaining windings said signal voltage in proportion to speed of rotation of said conductive sleeve in said air gap.

3. In a device of the class described, a primary core structure having a plurality of salient poles with windings thereon, a secondary core structure located within said primary core structure completing a continuous magnetic circuit therewith and defining an annular air gap therebetween, alternate windings on said primary core structure being adapted to be energized with an alternating current to produce a magnetic flux in said magnetic circuit, said secondary core structure comprising two cylindrical magnetic core members adjustable relative to one another, one of said core members being adapted to vary the reluctance in a portion of said magnetic circuit and the other said core members being adapted to shift the magnetic flux in another portion of said magnetic circuit, and a short circuited conductor means of electrically conductive material positioned in said annular air gap and disposed to rotate therein generating in the remainder of said windings on said primary core structure a signal proportional to its speed of rotation.

4. In a device of the class described, a primary core structure having a plurality of salient poles with windings thereon, a secondary core structure located within said primary core structure completing a continuous magetic circuit therewith and defining an annular air gap therebetween, alternate windings on said primary core structure being adapted to be energized with an alternating current to produce a magnetic flux in said magnetic circuit, means included in said secondary core structure for shifting the magnetic flux in a portion of said magnetic circuit, and a short circuited conductor means of electrically conductive material positioned in said annular air gap and disposed to rotate therein generating in the remainder of said windings on said primary core structure a signal proportional to its speed of rotation.

5. A device for the class described, a primary core structure having a plurality of salient poles with windings thereon, a secondary core structure including two cylindrical magnetic core members positioned within said primary core structure completing a continuous magnetic circuit thereby and defining an annular air gap therebetween, said iron core members being adjustable relative to one another and to said primary core structure, means including one of said secondary magnetic core members for introducing a variable air gap in said magnetic circuits, means including another said secondary core members for introducing a flux shifting means for said magnetic circuit, and a sleeve type conductor member positioned in said annular air gap and encircling said secondary core structure, said conductor member being disposed to rotate therein.

6. A device for the class described, a primary core structure having a plurality of salient poles with windings thereon, a secondary core structure including two cylindrical magnetic core members positioned within said primary core structure completing a continuous magnetic circuit thereby and defining an annular air gap therebetween adjustable relative to one another and to said primary core structure, means including one of said secondary core members for introducing a flux shifting means for said magnetic circuit, and a sleeve type conductor member positioned in said annular air gap and encircling said secondary core structure, said conductor member being disposed to rotate therein.

7. In a device for the class described, a stator having a plurality of poles with windings thereon, one group of which is adapted to be energized with an alternating current, the second group of which is adapted to have a signal output induced therein, a sleeve type rotor element of electrically conductive material positioned within an air gap defined by said poles, an inner pole member of magnetic material positioned within said sleeve type rotor and mounted on a frame with said stator, said rotor being adapted to be rotated relative to said stator and said inner pole to generate said signal in said second group of windings proportional to its speed of rotation, means included in said inner pole for balancing out extraneous in-phase flux generated by said alternating current in said first group of windings when said rotor is at a standstill, and means included in said inner pole for balancing out out-of-phase components of flux generated by said first named group of windings when said rotor is at a standstill.

8. A device for producing a voltage proportional to rotating speed comprising a stator having two electrically independent sets of windings mounted respectively on alternates of a plurality of salient poles, one set of said windings adapted to be energized from an alternating source of power to produce an energizing flux for said stator and the other set of windings being adapted to have a signal voltage generated therein, a stationary inner pole structure of magnetic material positioned within said stator to define an annular air gap therebetween, a short circuited conductor member of electrically conductive material mounted in said air gap and disposed to rotate therein to generate said signal voltage in the other of said sets of windings on said stator, and means included in said inner pole structure to balance out the effect of in-phase and out-of-phase components of said energizing flux when said rotor is at a standstill.

9. A device for producing a voltage proportional to rotating speed comprising, a stator having two electrically independent sets of windings mounted respectively on alternates of a plurality of salient poles, one set of said windings adapted to be energized from an alternating source of power to produce an energizing flux for said stator and the other set of windings being adapted to have a signal voltage generated therein, a stationary inner pole structure of magnetic material positioned within said stator to define an annular air gap therebetween, a short circuited conductor member of electrically conductive material mounted in said air gap and disposed to rotate therein to control said signal voltage produced in the other of said sets of windings on said stator, and means included in said inner pole structure for shifting the phase of a portion of said energizing flux.

10. A device for producing a voltage proportional to rotating speed comprising a stator having two electrically independent sets of windings mounted respectively on alternates of a plurality of salient poles, one set of said windings adapted to be energized from an alternating source of power to produce an energizing flux for said stator and the other set of windings being adapted to have a signal voltage generated therein, a stationary inner pole structure of magnetic material positioned within said stator to define an annular air gap therebetween, a short circuited conductor member of electrically conductive material mounted in said air gap and disposed to rotate therein to control said signal voltage produced in the other of said sets of windings on said stator, and a shading coil mounted on said inner pole structure and adapted to be rotationally adjusted relative to said salient poles of said stator.

11. In a device of the class described, a primary core structure having a plurality of salient pole members with windings thereon, a secondary core structure located within said primary core structure completing a magnetic circuit therewith and defining an annular air gap therebetween, said secondary core structure comprising two cylindrical magnetic core members adjustable relative to one another with one of said core structures having a non-uniform cross sectional area and the other having a shading coil thereon, and a short circuited conductor member of electrically conductive material positioned within said annular air gap and disposed to rotate therein.

ORVILLE J. UNDERWOOD.

REFERENCES CITED

The following references are of record in the file of this patent:

UNITED STATES PATENTS

| Number | Name | Date |
|---|---|---|
| 518,310 | Duncan | Apr. 17, 1894 |
| 717,497 | Cuenod | Dec. 30, 1902 |
| 2,110,673 | McConnell | Mar. 8, 1938 |